(12) United States Patent
Cheng et al.

(10) Patent No.: US 9,275,659 B2
(45) Date of Patent: Mar. 1, 2016

(54) PEG ONLY NEAR-FIELD TRANSDUCER

(71) Applicant: Seagate Technology LLC, Cupertino, CA (US)

(72) Inventors: Yuhang Cheng, Edina, MN (US); Chubing Peng, Eden Prairie, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 14/276,388

(22) Filed: May 13, 2014

(65) Prior Publication Data

US 2014/0376343 A1 Dec. 25, 2014

Related U.S. Application Data

(63) Continuation-in-part of application No. 14/069,960, filed on Nov. 1, 2013, now abandoned.

(60) Provisional application No. 61/838,862, filed on Jun. 24, 2013.

(51) Int. Cl.
| | |
|---|---|
| *G11B 11/00* | (2006.01) |
| *G11B 5/31* | (2006.01) |
| *G11B 5/40* | (2006.01) |
| *G11B 5/00* | (2006.01) |

(52) U.S. Cl.
CPC ............. *G11B 5/314* (2013.01); *G11B 5/3106* (2013.01); *G11B 5/3163* (2013.01); *G11B 5/40* (2013.01); *G11B 2005/0021* (2013.01); *Y10T 29/49032* (2015.01)

(58) Field of Classification Search
USPC .................................. 369/13.33, 13.32, 13.13
See application file for complete search history.

(56) References Cited

U.S. PATENT DOCUMENTS

| | | | |
|---|---|---|---|
| 5,600,619 A | 2/1997 | Takekoshi et al. | |
| 5,680,385 A | 10/1997 | Nagano | |
| 7,391,590 B2 | 6/2008 | Matono et al. | |
| 7,500,255 B2 | 3/2009 | Seigler et al. | |
| 7,609,480 B2 | 10/2009 | Shukh et al. | |
| 7,649,713 B2 | 1/2010 | Ota et al. | |
| 7,786,086 B2 | 8/2010 | Reches et al. | |
| 7,818,760 B2 | 10/2010 | Seigler et al. | |
| 7,848,056 B2 | 12/2010 | Sakamoto et al. | |
| 7,986,481 B2 | 7/2011 | Yamanaka et al. | |
| 8,077,558 B1 | 12/2011 | Tsutsumi et al. | |
| 8,077,559 B1 | 12/2011 | Miyauchi et al. | |
| 8,194,511 B2 | 6/2012 | Sasaki et al. | |
| 8,320,219 B1 | 11/2012 | Wolf et al. | |
| 8,320,220 B1 * | 11/2012 | Yuan et al. | 369/13.33 |

(Continued)

FOREIGN PATENT DOCUMENTS

WO WO2013163195 10/2013

OTHER PUBLICATIONS

File History for U.S. Appl. No. 14/313,197.

(Continued)

*Primary Examiner* — Tan X Dinh
(74) *Attorney, Agent, or Firm* — Hollingsworth Davis, LLC

(57) ABSTRACT

An apparatus for a heat assisted magnetic recording device that includes a write pole, a near-field transducer, and a heat sink. The near-field transducer is comprised only of a peg disposed adjacent the write pole. The heat sink is disposed between the write pole and at least a portion of the near-field transducer.

20 Claims, 7 Drawing Sheets

(56) References Cited

U.S. PATENT DOCUMENTS

| | | | |
|---|---|---|---|
| 8,339,740 B2 | 12/2012 | Zou et al. | |
| 8,351,307 B1 | 1/2013 | Wolf et al. | |
| 8,351,308 B2 | 1/2013 | Chou et al. | |
| 8,374,062 B2 | 2/2013 | Tanaka et al. | |
| 8,375,565 B2 | 2/2013 | Hu et al. | |
| 8,400,902 B2 | 3/2013 | Huang et al. | |
| 8,406,094 B2 | 3/2013 | Matsumoto | |
| 8,427,925 B2 | 4/2013 | Zhao et al. | |
| 8,451,555 B2 | 5/2013 | Seigler et al. | |
| 8,451,705 B2 | 5/2013 | Peng et al. | |
| 8,477,454 B2 | 7/2013 | Zou et al. | |
| 8,514,673 B1 | 8/2013 | Zhao et al. | |
| 8,526,275 B1* | 9/2013 | Yuan et al. | 369/13.33 |
| 8,565,049 B1 | 10/2013 | Tanner et al. | |
| 8,570,844 B1* | 10/2013 | Yuan et al. | 369/13.38 |
| 8,605,555 B1* | 12/2013 | Chernyshov et al. | 369/13.33 |
| 8,634,280 B1 | 1/2014 | Wang et al. | |
| 8,670,215 B2 | 3/2014 | Zou et al. | |
| 8,681,590 B2 | 3/2014 | Zhou et al. | |
| 8,705,327 B2 | 4/2014 | Matsumoto | |
| 8,796,023 B2 | 8/2014 | Reches et al. | |
| 8,804,468 B2 | 8/2014 | Zhao et al. | |
| 8,817,407 B2* | 8/2014 | Wessel et al. | 360/59 |
| 8,824,086 B2 | 9/2014 | Peng et al. | |
| 8,842,391 B2 | 9/2014 | Zou et al. | |
| 2004/0004792 A1 | 1/2004 | Hasegawa et al. | |
| 2005/0024957 A1 | 2/2005 | Gider et al. | |
| 2005/0041950 A1* | 2/2005 | Rottmayer et al. | 385/147 |
| 2006/0233061 A1 | 10/2006 | Rausch et al. | |
| 2007/0036040 A1 | 2/2007 | Mihalcea et al. | |
| 2007/0139818 A1* | 6/2007 | Shimazawa et al. | 369/13.33 |
| 2010/0214685 A1* | 8/2010 | Seigler et al. | 369/13.33 |
| 2010/0328807 A1* | 12/2010 | Snyder et al. | 360/59 |
| 2011/0235480 A1* | 9/2011 | Goulakov et al. | 369/13.35 |
| 2011/0294398 A1 | 12/2011 | Hu et al. | |
| 2012/0039155 A1 | 2/2012 | Peng et al. | |
| 2012/0045662 A1* | 2/2012 | Zou et al. | 369/13.33 |
| 2012/0218871 A1 | 8/2012 | Balamane et al. | |
| 2013/0258824 A1 | 10/2013 | Komura et al. | |
| 2013/0279315 A1 | 10/2013 | Zhao et al. | |
| 2013/0286804 A1* | 10/2013 | Zhao et al. | 369/13.33 |
| 2013/0286806 A1* | 10/2013 | Wessel et al. | 369/13.33 |
| 2014/0004384 A1 | 1/2014 | Zhao et al. | |
| 2014/0043948 A1 | 2/2014 | Hirata et al. | |
| 2014/0050057 A1 | 2/2014 | Zou et al. | |
| 2014/0226450 A1* | 8/2014 | Peng et al. | 369/13.33 |
| 2014/0376340 A1* | 12/2014 | Cheng et al. | 369/13.33 |
| 2014/0376341 A1 | 12/2014 | Wessel et al. | |
| 2014/0376342 A1 | 12/2014 | Wessel et al. | |
| 2014/0376344 A1 | 12/2014 | Zhao et al. | |
| 2014/0376345 A1 | 12/2014 | Seets et al. | |

OTHER PUBLICATIONS

File History for U.S. Appl. No. 14/069,960.
File History for U.S. Appl. No. 14/083,845.
File History for U.S. Appl. No. 14/286,279.
File History for U.S. Appl. No. 14/220,396.

\* cited by examiner ures and attached claims are approxima-
PEG ONLY NEAR-FIELD TRANSDUCER

RELATED PATENT DOCUMENTS

This application is a continuation-in-part of U.S. patent application Ser. No. 14/069,960, filed Nov. 1, 2013, and claims the benefit of Provisional Patent Application Ser. No. 61/838,862 filed on Jun. 24, 2013, which are both hereby incorporated herein by reference in their entirety.

SUMMARY

Embodiments disclosed include an apparatus for a heat assisted magnetic recording device that includes a write pole, a near-field transducer, and a heat sink. The near-field transducer is comprised only of a peg disposed adjacent the write pole. The heat sink is disposed between the write pole and at least a portion of the near-field transducer.

Embodiments are directed to a system that includes a write pole, a near-field transducer, a heat sink, and one or more layers of insulating material. The near-field transducer is comprised of only a peg that is disposed adjacent the write pole. The heat sink is disposed between the write pole and at least a portion of the near-field transducer. The layer of insulating material is disposed along the near-field transducer between the heat sink and the near-field transducer.

Further embodiments are directed to a method that includes forming a near-field transducer comprised of only a peg along a substrate of a heat assisted magnetic recording head, the near-field transducer interfaces with and extends away from an air bearing surface, forming a write pole adjacent the near-field transducer, the write pole interfaces with and extends away from the air bearing surface, and disposing a heat sink between at least a portion of the near-field transducer and the write pole.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
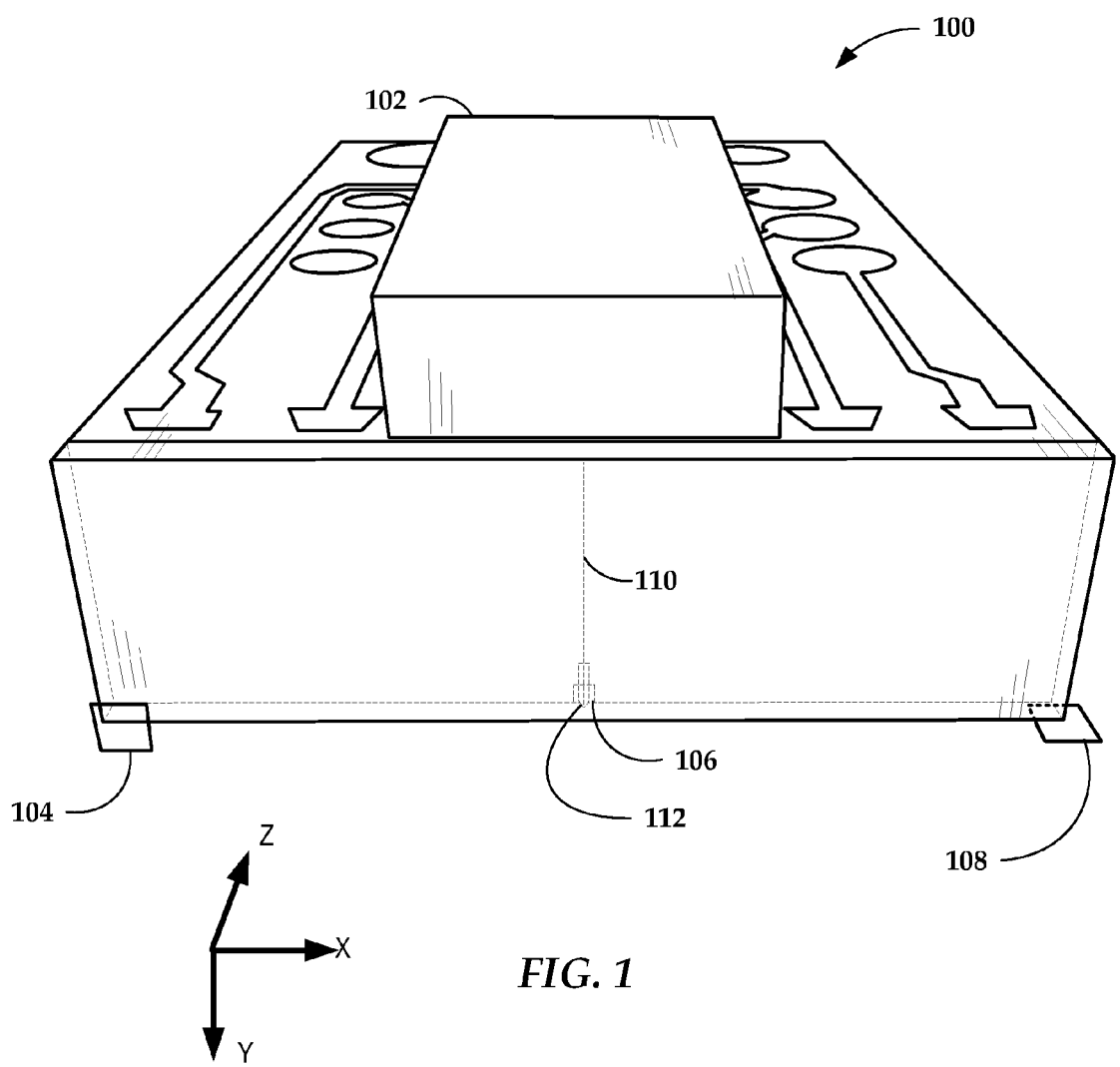
FIG. 1 is a perspective view of a hard drive slider that includes a disclosed near-field transducer.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various embodiments disclosed herein are generally directed to systems and apparatuses that facilitate coupling a laser diode to a magnetic writer that includes a magnetic write head. In particular, the systems and apparatuses include a plasmonic near-field transducer for heat-assisted magnetic recording (HAMR). Plasmonic near-field transducers can generate a large amount of heat in their writing tip also called a "peg". This heat can negatively impact the operational life of the near-field transducer. Disclosed are apparatuses and methods directed to increasing near-field transducer operational life by reducing likelihood of peg recession of the writing tip. Thus, the near-field transducer can better withstand heat buildup in the peg for heat-assisted magnetic recording.

Embodiments are directed to a near-field transducer comprised solely of a peg with no other additional near-field transducer components such as a disk. In some embodiments, the near-field transducer is disposed adjacent to, and in some instances may be contacted by, a separate component that comprises a heat sink. This heat sink is disposed between at least a portion of the near-field transducer and a write pole of a heat-assisted magnetic recording head. Additional embodiments can utilize one or more layers of electrically insulating material that is disposed between the near-field transducer and the heat sink. In further embodiments, the layer(s) can be comprised of a thermally conductive material. Further embodiments, can have one or more coupling layers disposed to contact the near-field transducer on one or more surfaces not contacted by the layer(s) of electrically insulating material. For example, the coupling layer(s) can be disposed along a non-media interfacing surface of the near-field transducer. In some embodiments, the coupling layer(s) will be constructed of materials that will not inhibit a laser in coupling to the near-field transducer. Thus, in some embodiments, the coupling layer(s) will have a refractive index below 2.4.

The present disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

One way to achieve a tiny confined hot spot is to use an optical near-field transducer (NFT), such as a plasmonic optical antenna or an aperture, located near an air-bearing surface of a hard drive slider. Light may be launched from a light source (e.g., a laser diode) into optics such as a waveguide integrated into the slider. Light propagating in the waveguide may be directed to an optical focusing element, such as a planar solid immersion mirror (PSIM). The PSIM may concentrate the energy into a NFT. The NFT causes the energy to be delivered to the media in a very small spot.

FIG. 1 is a perspective view of a hard drive slider that includes a disclosed plasmonic near-field transducer (NFT). HAMR slider 100 includes laser diode 102 located on top of HAMR slider 100 proximate to trailing edge surface 104 of HAMR slider 100. Laser diode 102 delivers light proximate to read/write head 106, which has one edge on air-bearing surface (also referred to as "media-facing surface" or "media interfacing surface") 108 of HAMR slider 100. Air-bearing surface 108 is held proximate to a moving media surface (not shown) during device operation.

Laser diode 102 provides electromagnetic energy to heat the media at a point near to read/write head 106. Optical coupling components, such as a waveguide 110, are formed integrally within HAMR slider 100 to deliver light from laser diode 102 to the media. In particular, local waveguide 110 and NFT 112 may be located proximate read/write head 106 to provide local heating of the media during write operations. Laser diode 102 in this example may be an integral, edge-emitting device, although it will be appreciated that waveguide 110 and NFT 112 may be used with any light source and light delivery mechanisms. For example, a surface emitting laser (SEL) may be used instead of the edge firing laser illustrated.

While the example in FIG. 1 shows laser diode 102 integrated with HAMR slider 100, the NFT 112 discussed herein may be useful in any type of light delivery configuration. For example, in a free-space light delivery configuration, a laser may be mounted externally to the slider, and coupled to the slider by way of optic fibers and/or waveguides. The slider in such an arrangement may include a grating coupler into which light is coupled and delivered to slider-integrated waveguide 110 which energizes the NFT 112.

A HAMR device utilizes the types of optical devices described above to heat a magnetic recording media (e.g., hard disc) in order to overcome superparamagnetic effects that limit the areal data density of typical magnetic media. When writing to a HAMR medium, the light can be concentrated into a small hotspot over the track where writing takes place. The light propagates through waveguide 110 where it is coupled to the NFT 112 either directly from the waveguide or by way of a focusing element. Other optical elements, such as couplers, mirrors, prisms, etc., may also be formed integral to the slider. The optical elements used in HAMR recording heads are generally referred to as integrated optics devices.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot is on the order of 50 nm or less. Thus the desired hot spot size is well below half the wavelength of the light. Optical focusers cannot be used to obtain the desired hot spot size, being diffraction limited at this scale. As a result, the NFT 112 is employed to create a hotspot on the media.

The NFT 112 is a near-field optics device designed to reach local surface plasmon resonance at a designed wavelength. A waveguide and/or other optical element concentrates light on a transducer region (e.g., focal point) where the NFT 112 is located. The NFT 112 is designed to achieve surface plasmon resonance in response to this concentration of light. At resonance, a high electric field surrounds the NFT 112 due to the collective oscillations of electrons at the metal surface. Part of this field will tunnel into a storage medium and get absorbed, thereby raising the temperature of a spot on the media as it being recorded. NFTs generally have a surface that is made of a material that supports surface plasmons ("plasmonic metal") such as aluminum, gold, silver, copper, or alloys thereof. They may also have other materials but they must have a material that supports surface plasmons on their outer surface.

Figure 2:
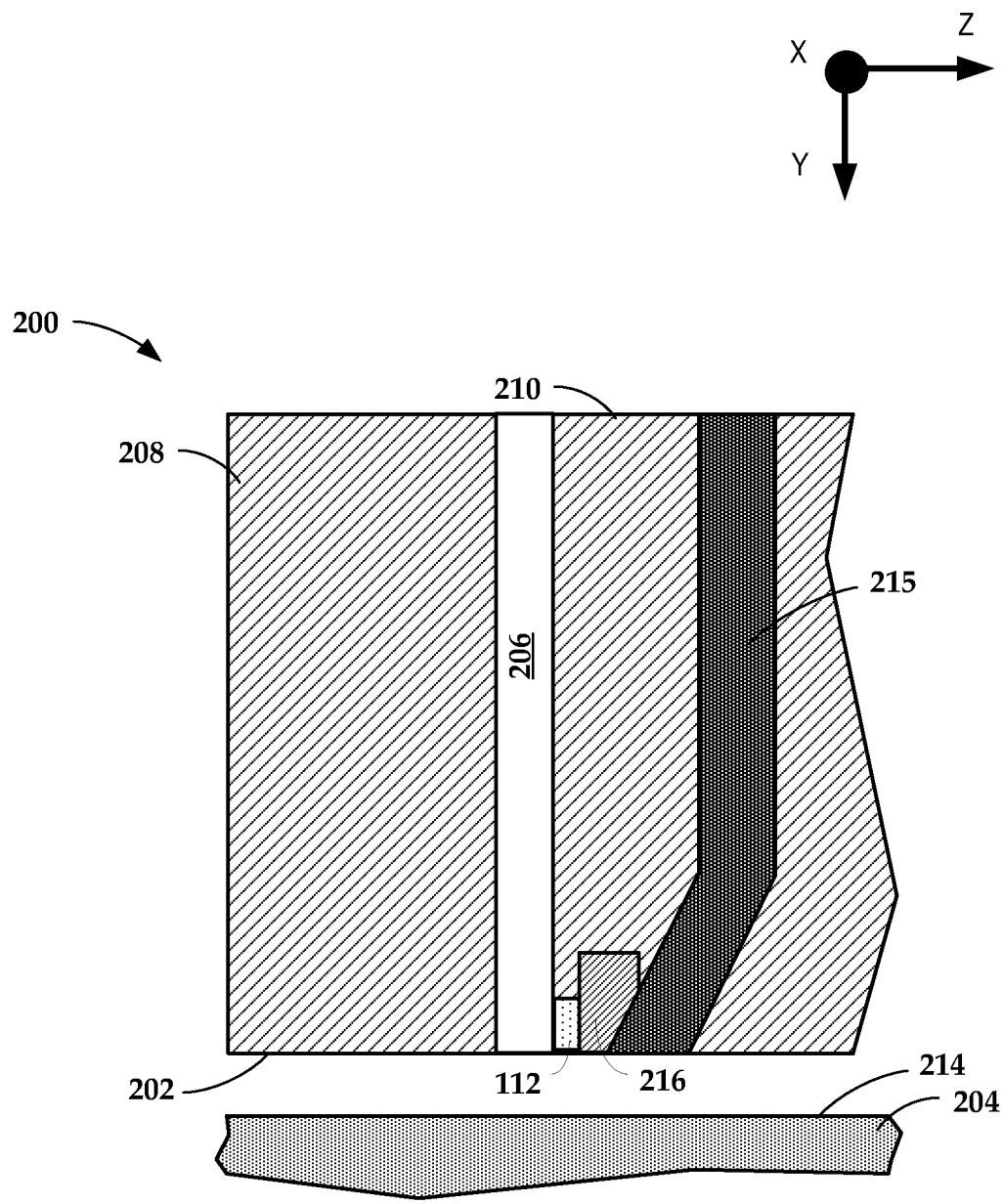
FIG. 2 is a side cross-sectional view of an apparatus that includes the near-field transducer of FIG. 1, a write pole, a heat sink, and a waveguide according to an example embodiment.

FIG. 2 is a cross-sectional view shows details of an apparatus 200 used for HAMR according to an example embodiment. The NFT 112 is located proximate a media interfacing surface 202 (e.g., ABS), which is held near a magnetic recording media 204 during device operation. In the orientation of FIG. 2, the media interfacing surface 202 is arranged parallel to the x-z plane. A waveguide core 206 may be disposed proximate the NFT 112, which is located at or near the media writing surface 214.

The waveguide core 206 is surrounded by cladding layers (FIG. 2A) that have different indices of refraction than the core 206. Light is delivered from the waveguide core 206 along the negative y-direction where it is coupled to the NFT 112. The NFT 112 delivers surface plasmon enhanced, near-field electromagnetic energy along the y-axis where it exits at the media writing surface 214. This may result in a highly localized hot spot (not shown) on the media surface 214 when the media 204 placed in close proximity to surface 202 of the apparatus 200. Further illustrated in FIG. 2 is a write pole 215 of the read/write head that is located alongside the NFT 112. The write pole 215 generates a magnetic field (e.g., perpendicular field) used in changing the magnetic orientation of the hotspot during writing.

Some embodiments of NFTs typically include an enlarged disk-shaped region as well a peg. The disk-shaped region will typically comprise between 90% and 95% of the volume of the NFT. The peg is in optical and/or electrical communication with the disk-shaped enlarged region and creates a focal point for the energy received by the enlarged region. In these NFTs, the enlarged disk-shaped region is configured to receive concentrated light from the laser diode/waveguide and is designed to help NFT achieve surface plasmon resonance in response to this concentration of light.

However, with this and other NFT configurations temperature increases in the peg is a challenge in HAMR write heads. For example, with a relatively large disk-shaped region and a relatively small peg, the larger disk-shaped region enlarges when heated at the expense of the smaller peg (i.e. a volume transformational mismatch occurs). This mismatch helps to drive peg deformation and peg recession, which can lead to failure of the entire HAMR device. It is hypothesized that peg deformation is a phenomenon driven by the exchange of particles and vacancies between the peg and the disk-shaped region. As discussed, this phenomenon may be driven by the volume transformational mismatch between the peg and the disk-shaped region as well as temperature differences between the two. It is believed peg recession is driven by peg deformation and is a process where a media interfacing surface of the peg retreats away from the media interfacing surface 202 and magnetic recording media 204. This process leads to failure of the HAMR device.

This disclosure proposes an approach and an apparatus that eliminates the enlarged region (i.e., any disk-shaped or otherwise shaped region) of the NFT. Thus, the NFT disclosed is a peg only NFT, sometimes referred to herein as a "nanorod" herein. The nanorod NFT has a uniform volume. Thus, the NFT has no volume transformational mismatch between components. As will be discussed, preliminary data indicates that this configuration will reduce instances of peg deformation and peg recession and increase the operational life of the HAMR device.

The apparatus disclosed utilizes a heat sink 216 disposed adjacent the NFT 112. In some embodiments, such as the embodiment illustrated in FIGS. 2 and 2A, the heat sink 216 is disposed between the write pole 215 and at least a portion of the NFT 112 to dissipate thermal energy away. The heat sink 216 comprises a separate component from the NFT 112 and can be comprised different materials and formed with different processes in some embodiments. The heat sink 216 does not provide plasmonic excitation to the peg as is the case with the enlarged disk-shaped area of some NFT designs previously discussed. As will be discussed, in some embodiments the heat sink 216 interfaces with one or more non-media interfacing end surfaces of the NFT 112 and may interface with other portions of the NFT 112 and other components. As used herein, the term "interface" or "interfacing" means to have a surface or surfaces that substantially face the surface or surfaces of another component. Thus, in cross-section, the surface or surfaces would extend substantially parallel with one another. Use of the term interface or interfacing does not require the component surfaces to be in physical contact with one another. Rather, the component surfaces can be spaced from one another by, for example, another component or layer(s).

Figure 2A:
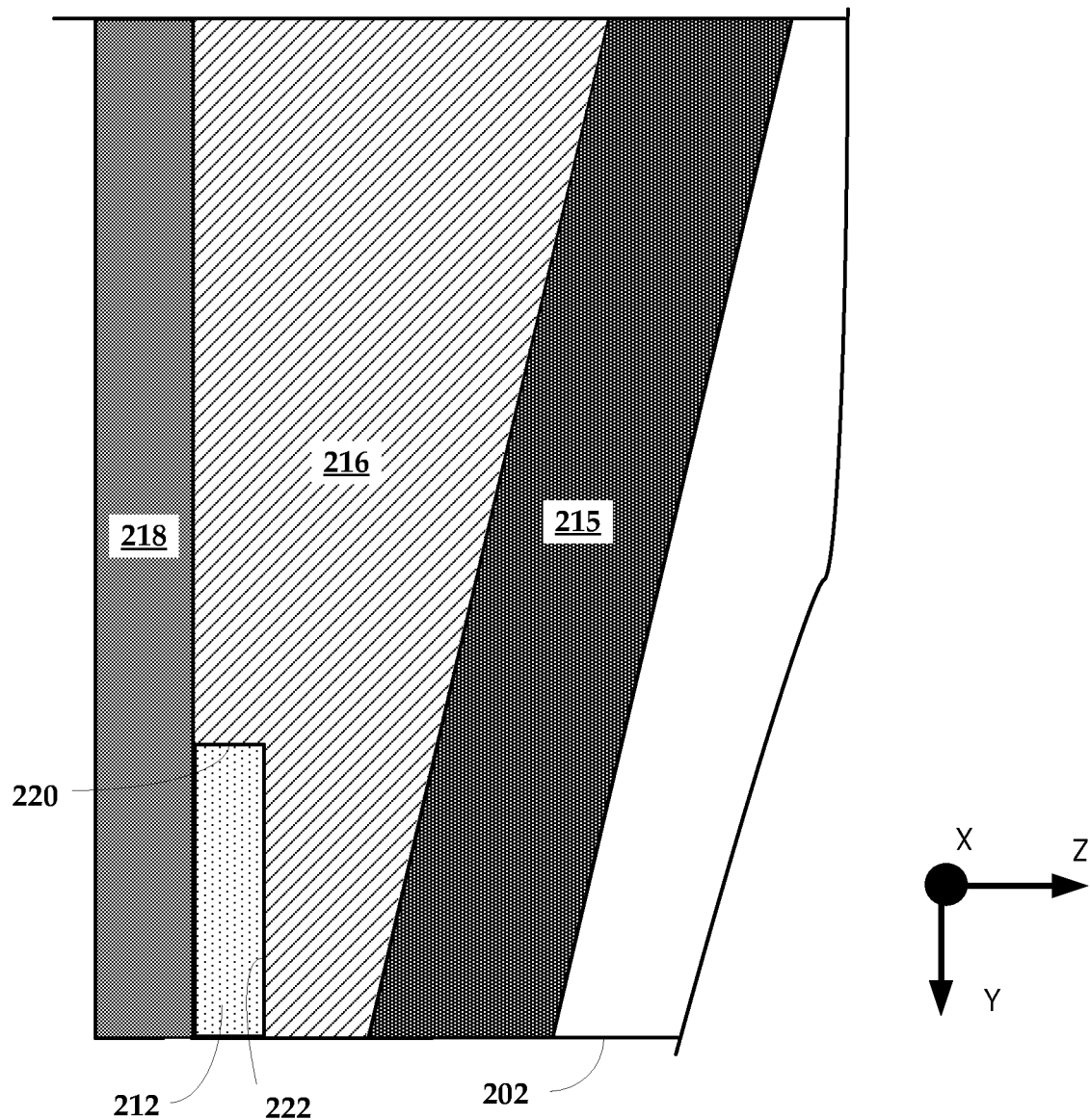
FIG. 2A is an enlargement of the side cross-sectional view of the near-field transducer, write pole, and the heat sink of FIG. 2.

FIG. 2A shows an enlargement of the apparatus 200 of FIG. 2. As illustrated in FIG. 2, the apparatus 200 includes the NFT 112, the heat sink 216, and the write pole 215 previously discussed. Additionally, the apparatus 200 includes core, cladding, and CNS 218 associated with waveguide 206 (FIG. 2).

In the embodiment of FIG. 2A, the NFT 112 is a peg only configuration. The entire NFT 112 can formed from substantially a same material in some embodiments. However, in other embodiments, NFT can be comprised of alloys, two or more alloys, or in some cases films. For example, in a peg utilizing Cu and Au, Cu film can be disposed nearest to the waveguide core while Au is disposed over the Cu and close to the write pole. As will be discussed, NFT 112 can have various configurations, including for example, a square, a rectangular, a circular, or an irregular cross-sectional area. The specific wavelength of light from the laser diode dictates the configuration of the NFT 112 including a length of the peg in order to get optimal (maximum) coupling efficiency of the laser light to the NFT 112.

The NFT 112, the heat sink 216, the write pole 215, and the core, cladding, and CNS 218 extend to terminate substantially uniformly along the media interfacing surface 202. The NFT 112 can be disposed other substrate adjacent the core, cladding, and CNS 218 layers. The heat sink 216 is disposed between the write pole 215 and portions of the NFT 112. In the embodiment illustrated in FIG. 2A, the heat sink 216 contacts several surfaces of the NFT 112 including one or more non-media interfacing end surfaces 220 and one or more lengthwise extending surfaces 222. In FIG. 2A, one or more non-media interfacing end surfaces 220 extend generally parallel with media interfacing surface 202. The one or more lengthwise extending surfaces 222 extend generally perpendicular to the one or more lengthwise extending surfaces 222. As shown, the heat sink 216 extends with the NFT 112 along an entire length thereof (i.e. along the entire length of lengthwise extending surfaces 222). However, the heat sink 216 can extend with the NFT 112 along the length thereof from between 25 percent to 100 percent of the total length of the NFT 112 in some embodiments.

The heat sink 216 is comprised of any material capable of electrically insulating the NFT 112 from the surrounding materials, i.e. heat sink 216 and write pole 215. According to some embodiments, the heat sink 216 is comprised of an electrically insulating material having a thermal conductivity above 4 W/(m*K). In some embodiments, the thermal conductivity is much higher. The insulating materials can variously comprise, for example, diamond, AlN, MgO, AlO, MgO, BeO, CrO, SiO, BN, Si, SiC, carbide, and nitride.

Figure 3:
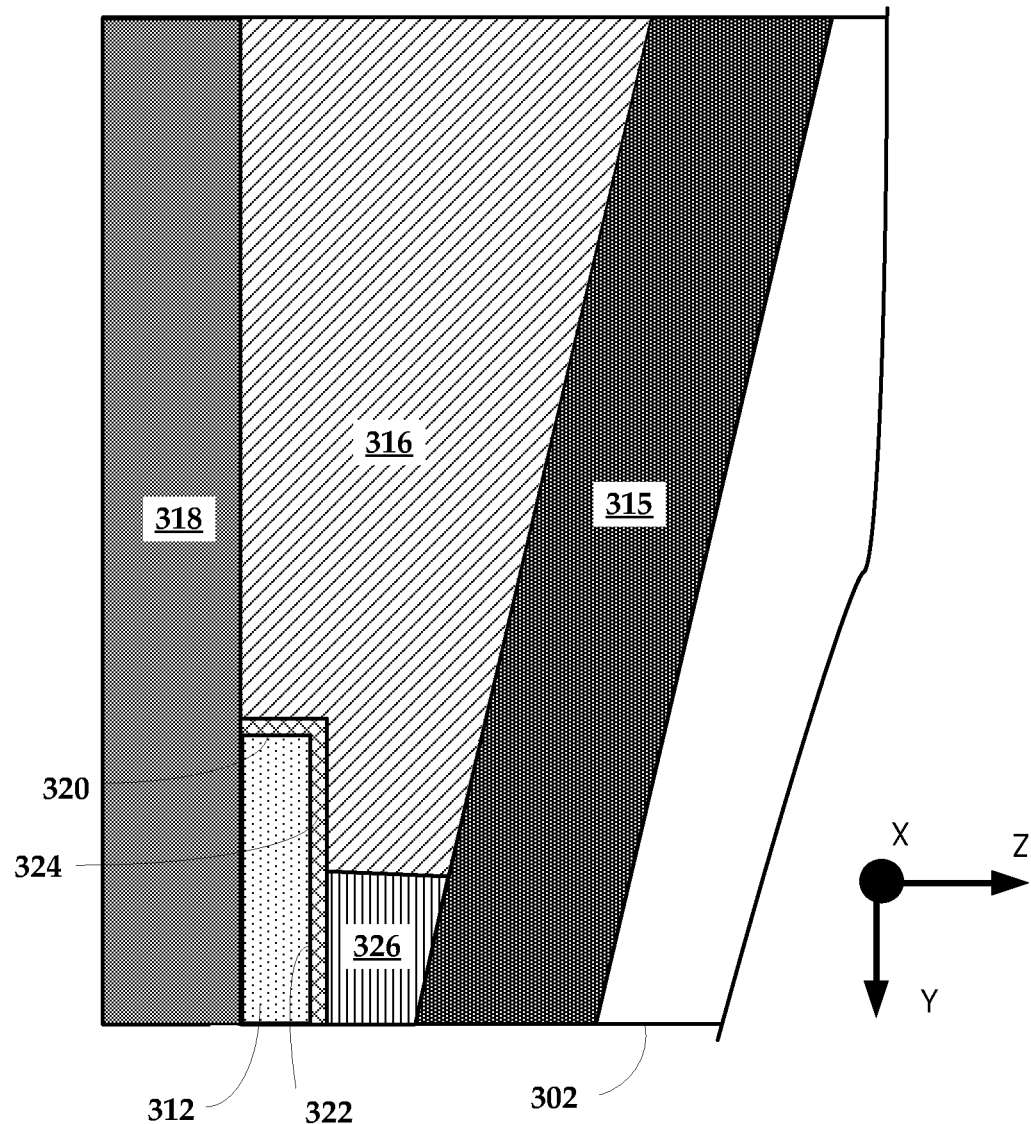
FIG. 3 is a side cross-sectional view of another embodiment of an apparatus including one or more layers of material disposed between the near-field transducer and the heat sink.

FIG. 3 shows a cross-section of another embodiment of an apparatus 300 for use with HAMR. The apparatus includes an NFT 312, a write pole 315, a heat sink 316, a core, cladding, and CNS 318, one or more layers 324, and a spacer 326.

Similar to the embodiment of FIG. 2A, the NFT 312 has a peg only configuration. The NFT 312, the write pole 315, the core, cladding, and CNS 318, the layer 324, and the spacer 326 extend to terminate substantially uniformly along the media interfacing surface 302. The spacer 326 is disposed between the write pole 315 and a portion of the NFT 312. The spacer 326 can be formed by a deposition process in some instances, and can be comprised of an electrically insulating material. The heat sink 316 is disposed between the write pole 315 and portions of the NFT 312 and abuts the spacer 326 on a non-media interfacing surface. Thus, heat sink 316 extends less than an entire length of the NFT 312.

The one or more layers 324 can be comprised of one or more layers of electrically insulating material formed by deposition or similar fabrication process. The one or more layers 324 are disposed along one or more non-media interfacing end surfaces 320 and one or more lengthwise extending surfaces 322 of the NFT 312 and is contacted by the heat sink 316. As illustrated, the one or more layers 324 can extend with the NFT 312 along an entire length thereof (i.e. along the entire length of lengthwise extending surfaces 322). In some embodiments, the one or more layers 324 are comprised of an electrically insulating material having a thermal conductivity above 4 W/(m*K). In some embodiments, the thermal conductivity is much higher. The insulating materials can variously comprise, for example, diamond, AlN, MgO, AlO, MgO, BeO, CrO, SiO, BN, Si, SiC, carbide, and nitride. The one or more layers 324 can have a thickness of between 0.5 nm and 10.0 nm in some embodiments. The addition of the layer(s) 324 allows heat sink 316 to be comprised of any metallic material with high thermal conductivity (e.g., above 10 W/(m*K)) such as, for example, Au, Cu, Ag, Al, W, Ta, Mo, Mg, Zn, Rh, Ir, Ru, Pt, Si, Fe, Co, Nb, Y, Zr, Ti, Pb, Cr, Ni, B, Mn, V, Tc, Cd, Hf, Sr, and various alloys thereof.

Figure 4:
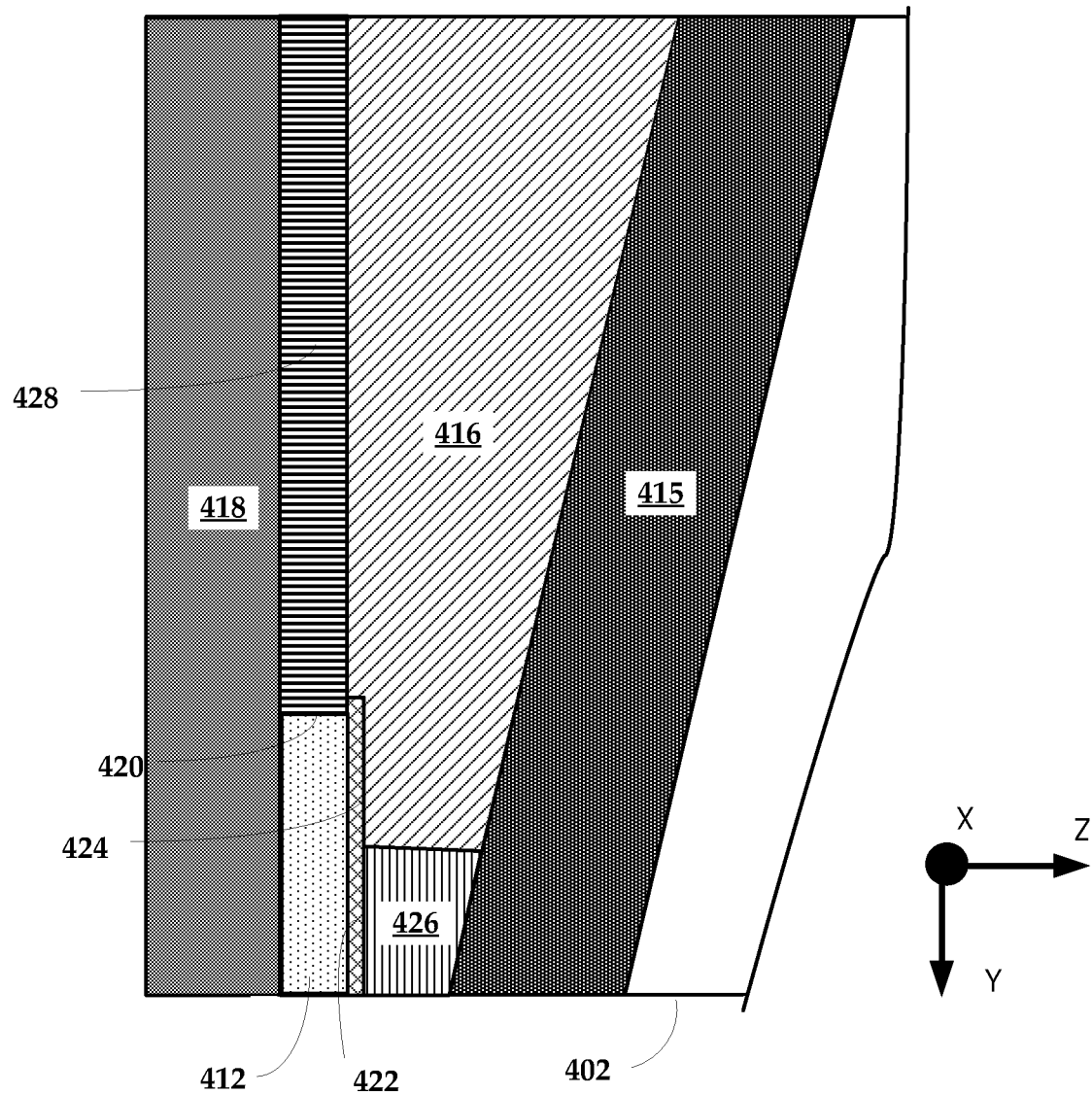
FIG. 4 is side cross-sectional view of yet another embodiment of an apparatus including one or more coupling layers disposed to contact a non-media interfacing end surface of the near-field transducer.

FIG. 4 shows a cross-section of yet another embodiment of an apparatus 400 for use with HAMR. The apparatus includes an NFT 412, a write pole 415, a heat sink 416, a core, cladding, and CNS 418, one or more layers 424, a spacer 426, and one or more coupling layers 428. The embodiment of FIG. 4 is configured and operates in a manner similar to the embodiment of FIG. 3. Thus, the NFT 412 has a peg only configuration. The NFT 412, the write pole 415, the core, cladding, and CNS 418, the one or more layers 424, and the spacer 426 extend to terminate substantially uniformly along the media interfacing surface 402. The spacer 426 is disposed between the write pole 415 and a portion of the NFT 412 and in some embodiments has a width of between 20 and 100 nm. The heat sink 416 is disposed between the write pole 415 and portions of the NFT 412 and abuts the spacer 426 on a non-media interfacing surface thereof. Thus, heat sink 416 extends less than an entire length of the NFT 412.

In the embodiment shown in FIG. 4, the one or more layers 424 are disposed along one or more lengthwise extending surfaces 422 of the NFT 412 and are contacted by the heat sink 416. Layer 424 extends with the NFT 412 along an entire length thereof (i.e. along the entire length of lengthwise extending surfaces 422). The one or more layers 424 and heat sink 416 can be comprised of similar materials to those discussed in reference to the embodiment of FIG. 3.

The one or more coupling layers 428 are disposed between the heat sink 416 and the core and cladding 418 and extend to contact the one or more non-media interfacing end surfaces 420 of NFT 412. The one or more coupling layers 428 can be constructed of materials that aid (or at least are non-detrimental) in the coupling of laser light to the NFT. Thus, in some embodiments the coupling layer 428 can be constructed of materials have a refractive index below 2.4. The coupling layers 428 can be comprised of, for example, $SiO_2$, $Al_2O_3$, MgO, BeO, AlN, BN, and a mixture of the aforementioned materials. Additionally, in some embodiments the coupling layer 428 can be comprised of additional or differing electrically insulating materials as desired.

Figure 5:
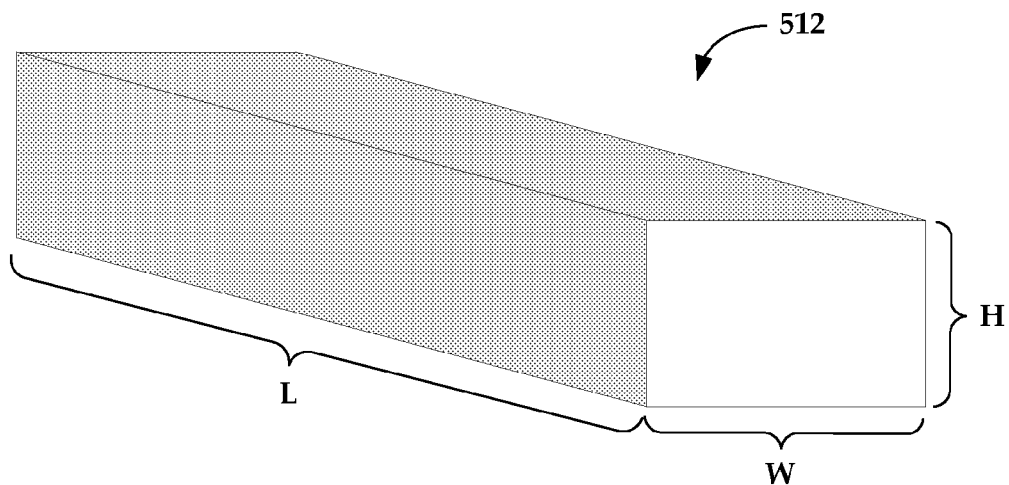
FIG. 5 is perspective view of one embodiment of the near field transducer.

FIG. 5 shows an exemplary embodiment of an NFT 512. The NFT 512 has a nanorod configuration (i.e. has a peg only design) with a uniform cross-sectional area. In FIG. 5, NFT 512 is illustrated with a rectangular cross-sectional area. However, other embodiments can have various configurations including, for example, a square, a circular, or an irregular cross-sectional area. The specific wavelength of light from the laser diode dictates the configuration of the NFT 512 including a length of the peg in order to get optimal (maximum) coupling efficiency of the laser light to the NFT 512. The NFT 512 has a length L of between 10 nm and 300 nm in some embodiments. In other embodiments, the length L is between 50 nm and half of a wavelength of light from the laser diode. The NFT can have at least one of a height H and a width W of between 5 nm and 100 nm in some embodiments.

Figure 6:
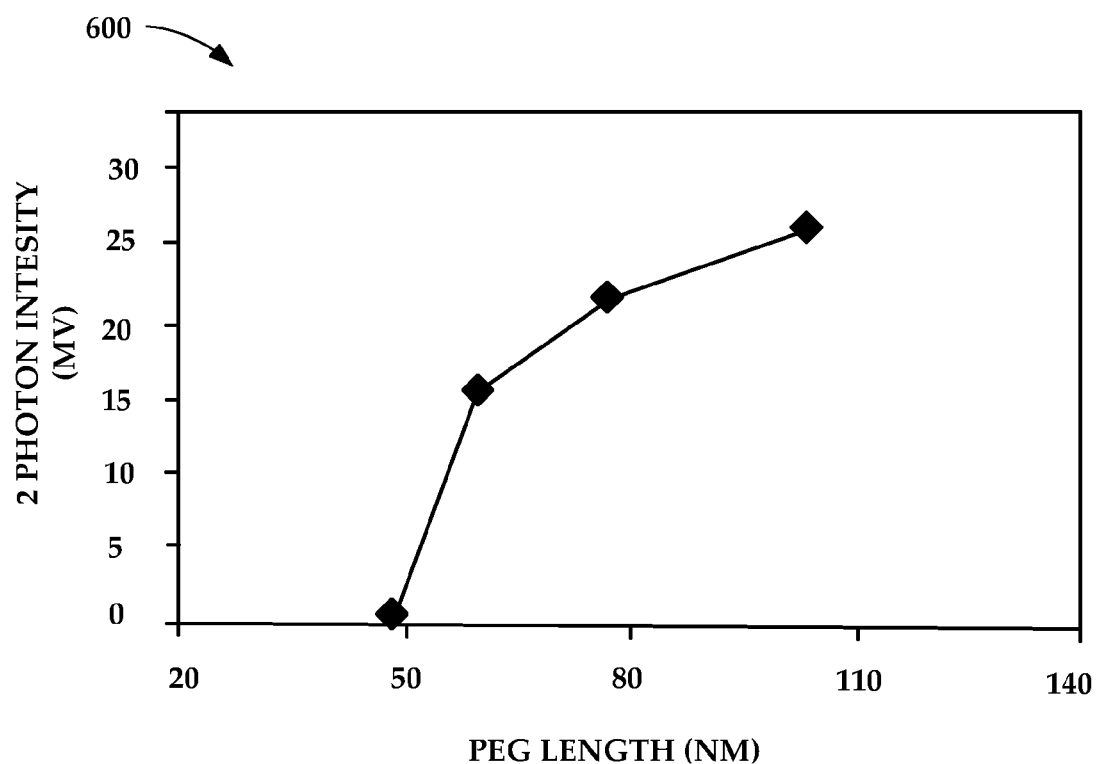
FIG. 6 is a graph of the measured effect of two photon intensity vs. peg length for a near-field transducer mounted in a head without a disk according to one embodiment.

FIG. 6 shows a graph 600 of the measured effect of two photon intensity v. peg length for a nanorod configured NFT mounted in a head without a disk. Two photon intensity is closely related to the heating efficiency of the head in HAMR applications. The two photon intensity was measured at 0.1 mW. In the experiment, the NFT was comprised of Au. The maximum two photon illumination intensity occurred at a peg length of 100 nm.

Additionally, the thermal stability of the NFT with the nanorod only configuration was investigated using isothermal annealing. It was found that the NFT remained unchanged after annealing at 400° C. for 30 minutes. These and other experiments tend to suggest that an NFT with a nanorod only configuration has a high thermal stability and may be a viable configuration for an NFT for HAMR and other applications.

Figure 7:
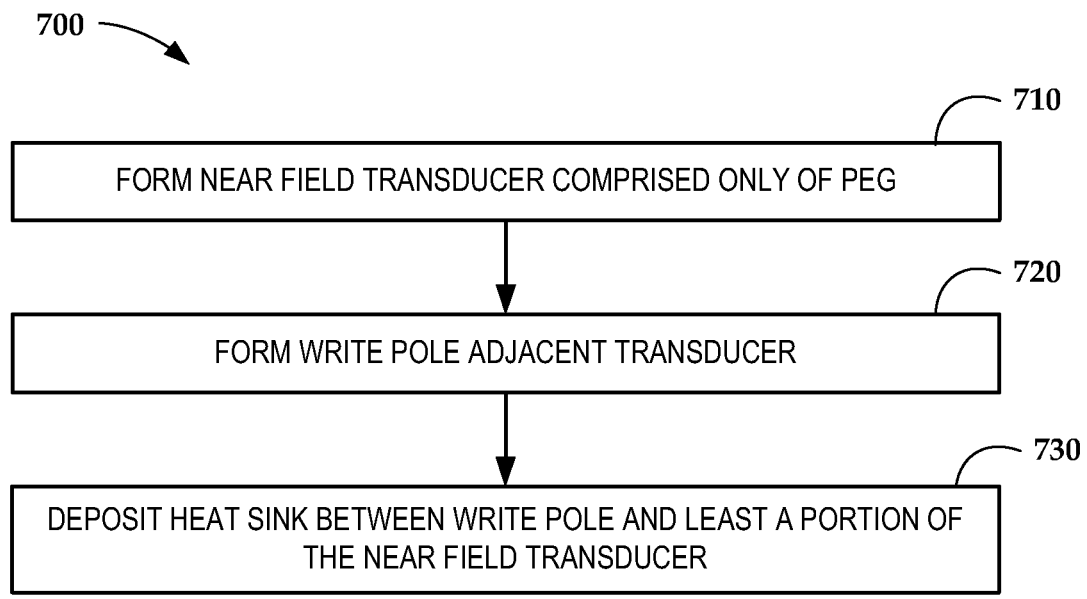
FIG. 7 is a flow chart of a fabrication method according to an example embodiment.

FIG. 7 illustrates a method 700 of fabricating an apparatus for a heat assisted magnetic recording device. Step 710 of the method 700 forms a near-field transducer comprised of only a peg along a substrate of a heat assisted magnetic recording head. The near-field transducer interfaces with and extends away from an air bearing surface in some embodiments. The method 700 proceeds to step 720, which forms a write pole adjacent the near-field transducer. The write pole interfaces with and extends away from the air bearing surface in some embodiments. In step 730, the method 700 deposits a heat sink between at least a portion of the near-field transducer and the write pole. Additional steps or sub-steps can be performed, for example, the method 700 can additionally deposit a layer(s) of electrically insulating material between the heat sink and the near-field transducer. The method 700 can also deposit a coupling layer(s) along a non-media interfacing surface of the electrically insulating material.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. All references cited within are herein incorporated by reference in their entirety.

What is claimed is:

1. An apparatus for a heat assisted magnetic recording device, comprising:
   a write pole;
   a near-field transducer comprised only of a peg having a uniform cross-sectional area disposed adjacent the write pole, the near-field transducer having a length of half of a wavelength of light used by a laser diode or less;
   a heat sink disposed between the write pole and at least a portion of the near-field transducer; and
   one or more layers of an electrically insulating material disposed between the heat sink and the near-field transducer, the one or more layers extending along an entire length of the near-field transducer.

2. The apparatus of claim 1, wherein the near-field transducer has a length of between 50 nm and half of a wavelength of light used by a laser diode.

3. The apparatus of claim 1, wherein the heat sink extends with the near-field transducer along a length thereof from between 10 percent to 100 percent of a total length of the near-field transducer.

4. The apparatus of claim 1, wherein the heat sink interfaces with one or more non-media interfacing end surfaces of the near-field transducer.

5. The apparatus of claim 1, wherein the heat sink comprises an electrically insulating material having a thermal conductivity above 4 W/(m*K).

6. The apparatus of claim 1, wherein the heat sink comprises at least one of diamond, AN, MgO, AlO, MgO, BeO, CrO, SiO, BN, Si, SiC, carbide, and nitride.

7. The apparatus of claim 1, wherein the heat sink comprises at least one of a metallic material.

8. The apparatus of claim 1, wherein the one or more layers of insulating material has a thickness between 0.5 nm and 10.0 nm.

9. The apparatus of claim 1, further comprising one or more coupling layers disposed along a non-media interfacing surface of the near-field transducer.

10. The apparatus of claim 9, wherein the one or more coupling layers have refractive index less than 2.4.

11. A system, comprising:
    a write pole;
    a near-field transducer comprised of only a peg having a uniform cross-sectional area disposed adjacent the write pole, the near-field transducer having a length of half of a wavelength of light used by a laser diode or less;

a heat sink disposed between the write pole and at least a portion of the near-field transducer;

one or more layers of an electrically insulating material disposed along the near-field transducer between the heat sink and the near-field transducer, the one or more layers extending along an entire length of the near-field transducer; and one or more coupling layers disposed along a non-media interfacing surface of the near-field transducer.

12. The system of claim 11, wherein the one or more coupling layers comprise at least one of $SiO_2$, $Al_2O_3$, MgO, AlN, BN, and BeO.

13. The apparatus of claim 11, wherein the one or more layers of insulating material have a thickness between 0.5 nm and 10.0 nm.

14. A method of fabricating an apparatus for a heat assisted magnetic recording device, comprising:

forming a near-field transducer comprised of only a peg having a uniform cross-sectional area along a substrate of a heat assisted magnetic recording head, wherein the near-field transducer interfaces with and extends away from an air bearing surface, and the near-field transducer has a length of half of a wavelength of light used by a laser diode or less;

forming a write pole adjacent the near-field transducer, wherein the write pole interfaces with and extends away from the air bearing surface;

disposing a heat sink between at least a portion of the near-field transducer and the write pole; and depositing one or more layers of an electrically insulating material along the near-field transducer between the heat sink and the near-field transducer, the one or more layers extending along an entire length of the near-field transducer.

15. The method of claim 14, further comprising depositing one or more coupling layers along a non-media interfacing surface of the insulating material.

16. The apparatus of claim 1, wherein:
the near-field transducer comprises a non-media interfacing end surface and a lengthwise extending surface; and
the one or more layers extend along the non-media interfacing end surface and the lengthwise extending surface.

17. The apparatus of claim 1, wherein the near-field transducer has a length of between 10 nm and 300 nm.

18. The apparatus of claim 11, wherein:
the near-field transducer comprises a non-media interfacing end surface and a lengthwise extending surface; and
the one or more layers extend along the non-media interfacing end surface and the lengthwise extending surface.

19. The apparatus of claim 11, wherein the near-field transducer has a length of between 10 nm and 300 nm.

20. The method of claim 14, wherein:
the near-field transducer comprises a non-media interfacing end surface and a lengthwise extending surface; and
the method further comprises depositing the one or more layers along the non-media interfacing end surface and the lengthwise extending surface.

\* \* \* \* \*